United States Patent
Babst et al.

(10) Patent No.: US 8,608,317 B2
(45) Date of Patent: Dec. 17, 2013

(54) PROJECTION OF VARIOUS IMAGE CONTENTS IN A CABIN OF A TRANSPORT MEANS

(75) Inventors: Ulrich Babst, München (DE); Torsten Jaunich, Fulda (DE); Daniel Dreyer, München (DE); Hans Lobentanzer, München (DE); Marc S. Velten, München (DE); Holger Schmidt, Putzbrunn (DE)

(73) Assignee: Airbus S.A.S. (FR)

( * ) Notice: Subject to any disclaimer, the term of this patent is extended or adjusted under 35 U.S.C. 154(b) by 672 days.

(21) Appl. No.: 12/600,135

(22) PCT Filed: May 9, 2008

(86) PCT No.: PCT/EP2008/055754
§ 371 (c)(1),
(2), (4) Date: Dec. 14, 2010

(87) PCT Pub. No.: WO2008/138890
PCT Pub. Date: Nov. 20, 2008

(65) Prior Publication Data
US 2011/0095911 A1    Apr. 28, 2011

(30) Foreign Application Priority Data
May 16, 2007   (DE) .................. 10 2007 023 344

(51) Int. Cl.
*G03B 21/00* (2006.01)
(52) U.S. Cl.
USPC ............... 353/70; 353/30; 353/34; 353/74; 353/79; 353/94; 348/575; 348/750

(58) Field of Classification Search
USPC .......... 353/30, 31, 33, 34, 37, 69, 70, 72, 74, 353/79, 85, 94, 98–99, 119, 122; 349/5, 349/7–9; 348/135, 136, 571, 575, 748, 750; 362/471, 231, 470, 479, 483, 490
See application file for complete search history.

(56) References Cited

U.S. PATENT DOCUMENTS

| | | | |
|---|---|---|---|
| 6,817,721 B1 * | 11/2004 | Ulichney et al. | 353/69 |
| 6,964,481 B2 * | 11/2005 | Pho et al. | 353/12 |
| 7,097,307 B2 * | 8/2006 | Lawrence | 353/28 |
| 7,178,954 B2 * | 2/2007 | Blechschmidt | 362/471 |
| 7,769,398 B2 * | 8/2010 | Marston et al. | 455/463 |
| 7,880,636 B2 * | 2/2011 | Heym | 340/815.45 |

(Continued)

FOREIGN PATENT DOCUMENTS

| | | |
|---|---|---|
| DE | 29708850 U1 | 7/1997 |
| DE | 10215893 C1 | 10/2003 |

(Continued)

*Primary Examiner* — Georgia Y Epps
*Assistant Examiner* — Sultan Chowdhury
(74) *Attorney, Agent, or Firm* — Lerner, David, Littenberg, Krumholz & Mentlik, LLP (57) ABSTRACT

According to an embodiment of the present invention a projection facility for projecting image contents onto an inside wall in an open cabin of a transport means, with which any given image contents can be projected onto a curved inside wall in a large-scale manner. The projection facility may comprise, apart from several projectors, several mirrors for deflecting the image contents. This allows image quality to be improved.

12 Claims, 6 Drawing Sheets

(56) References Cited

U.S. PATENT DOCUMENTS

| | | |
|---|---|---|
| 2003/0025649 A1* | 2/2003 | Wynne Willson ................ 345/6 |
| 2003/0193651 A1 | 10/2003 | Egle |
| 2005/0264765 A1 | 12/2005 | Yang et al. |
| 2007/0024821 A1 | 2/2007 | Devos et al. |
| 2007/0097210 A1* | 5/2007 | Chang ........................... 348/135 |
| 2008/0012728 A1 | 1/2008 | Heym |

FOREIGN PATENT DOCUMENTS

| | | |
|---|---|---|
| DE | 20211819 U1 | 12/2003 |
| DE | 102004031700 A1 | 1/2006 |
| EP | 1517549 A2 | 3/2005 |
| WO | 0133297 A1 | 5/2001 |
| WO | 02089474 A1 | 11/2002 |
| WO | 2006024254 A1 | 3/2006 |

* cited by examiner

PROJECTION OF VARIOUS IMAGE CONTENTS IN A CABIN OF A TRANSPORT MEANS

CROSS-REFERENCE TO RELATED APPLICATIONS

This application is a national phase entry under 35 U.S.C. §371 of International Application No. PCT/EP2008/055754, filed May 9, 2008, which claims the benefit of the filing date of German Patent Application No. 10 2007 023 344.4 filed May 16, 2007, the disclosures of which applications are hereby incorporated herein by reference.

The invention relates to projection facilities in a cabin of a transport means. In particular, the present invention relates to a ceiling projection device for projecting image contents onto an inside wall of a transport means, to the use of such a ceiling projection device in an aircraft, an aircraft with a ceiling projection device, to a method for projecting image contents onto an inside wall of a transport means, as well as to a projection system.

FIELD OF THE INVENTION

Presentation of certain information in today's aircraft is in the form of so-called "signs", which present information in the folio of writing or pictograms. These are, for example, signs or illuminated panels for the presentation of commands or warnings such as "no smoking" or "fasten seat belt", for example. These signs have the disadvantage that the information they carry cannot be altered and is permanently present.

TECHNICAL BACKGROUND

Nowadays films or videos are shown for the entertainment of passengers, which films or videos are projected onto a large screen in the front area of the passenger cabin or are shown on relatively small monitors or screens. Passengers can see the image information only if they look at the screen or the monitor (i.e. in spatially limited locations).

It is an object of the present invention to propose an improved presentation of various image contents in an aircraft cabin.

According to one embodiment of the present invention a ceiling projection device (facility) for projecting image contents onto an inside wall of a cabin (open cabin) of a transport means is proposed, wherein the ceiling projection facility comprises a projector for generating optical image contents and for projecting the image contents generated by the projector onto an inside wall of a transport means.

The inside wall may, for example, be a ceiling panel, a side wall or the floor of the cabin. The cabin of a transport means may, for example, be a passenger cabin in an aircraft.

SUMMARY OF THE INVENTION

The ceiling projection facility may also be used in cabins of other transport means such as in a bus, a ship or a railway carriage, for example.

According to a further embodiment of the present invention the ceiling projection device comprises a combination of a projector and a reflecting medium, such as a mirror for example, which interact in such a way that the image or the film generated by the projector is not directed directly onto the ceiling but is deflected, after leaving the projector, by the minor in direction of the ceiling panel. If a mirror is not provided the wall is directly irradiated. The mirror/the reflecting medium has the effect of lengthening the path which the image has to travel from the projector to the ceiling (panel). In this way the angle of impact of the image onto the panel can be adjusted without having to alter the mounting location of the projector. Rather, the projector may be tilted. By an appropriate tilting of the mirror (possibly in combination with moving the mirror) the location of impact and the angle of impact can be correspondingly adjusted.

According to a further embodiment of the present invention the mirror comprises a ball-joint bracket for accurate adjustment of the location at which the image contents are projected onto the ceiling panel or the inside wall.

Due to the ball-joint bracket a three-dimensional tilting of the mirror is possible. The mirror may be tilted both along the horizontal and along the vertical. In this way the image generated by the projector/the film generated by the projector may be deflected both in upward and in forward or in rearward direction (i.e. laterally) in order to reach quite different locations in the cabin.

According to a further embodiment of the present invention the projector comprises a support arm with which the projector is fastened to a cabin structure of the transport means. The support arm may be constructed in such a way that the projector is tiltable, height-adjustable or horizontally movable. The support arm may consist of aluminium, for example.

According to a further embodiment of the present invention the projector is integrated in an overhead storage bin of the transport means, in a passenger seat of the transport means or in a floor element of the transport means.

The mirror also is integrated in an overhead storage bin, for example.

In this way passengers are not hindered by the projector and space is saved.

According to a further embodiment of the present invention the overhead storage bin comprises a frame with a trapezoidal cut-out thereby permitting light from the projector to only exit from the overhead storage bin in a trapezoidal cone. Accidental blinding of passengers can thereby be avoided.

According to a further embodiment of the present invention the ceiling panel is a semi-transparent panel, wherein the projector is arranged above the semi-transparent ceiling panel of the cabin.

The projector can thus project the image contents from above onto the semi-transparent ceiling panel. These image contents can then be seen from below by the passengers.

According to a further embodiment of the present invention the ceiling projection device further comprises an infrared receiver on the detector for detecting an optical On/Off signal and an infrared diode for generating an optical On/Off signal, whereby generating the optical On/Off signal is triggered by a control unit connected to the infrared diode via a cable. Furthermore, according to a further embodiment of the present invention a receiver for wirelessly detecting an On/Off signal is provided. Triggering the ceiling projection facility via a cable is also possible.

To this end the control unit comprises a switch for example, with which a user can switch the projector on or off. When the switch is operated the control unit sends a corresponding signal to the infrared diode whereupon the diode generates a corresponding optical signal. The optical signal of the infrared diode is then received by the infrared receiver of the detector and processed accordingly. The detector can thus, even if it is fitted above the ceiling or in the overhead storage bin, be easily switched on or off from another location in the passenger cabin.

According to a further embodiment of the present invention the ceiling projection device further comprises a computer (calculation unit) for deskewing or equalizing the image contents prior to projection onto the ceiling panel or the inside wall. This may be a suitable computer program, for example, which changes the image contents in such a way that the final projection of the images onto the ceiling surface of the panel is effected without distortion. This requires exact knowledge of the corresponding geometries. For example, it is important to know the exact location of the projector and the mirror, the angle of impact of the projection beam and the shape of the ceiling panel.

According to a further embodiment of the present invention the ceiling projection facility further comprises a DVD player controlled by a computer program for splitting the image contents up into three identically sized partial videos (for example a so-called "software DVD player"). Furthermore three computers for reading-in one of the three partial videos, respectively, and for correcting the respective one partial video are provided. Each of the three computers comprises two graphic cards which are adapted for further processing the respective one partial video and for providing various image data at four projectors, respectively thereby permitting a continuous image to be projected onto the ceiling panel/the inside wall.

According to a further embodiment of the present invention hardware-based image correction (i.e. equalization) is provided.

According to a further embodiment of the present invention a projection system for the ceiling projection of image contents in a transport means, such as an aircraft, is proposed which comprises a plurality of ceiling projection devices as described above.

For example the projection system may comprise 12 projectors mounted in the overhead storage bins and a corresponding number of deflecting mirrors.

Furthermore the use of a ceiling projection facility in an aircraft is proposed. According to a further embodiment of the present invention an aircraft with a corresponding ceiling projection facility is proposed.

According to a further embodiment of the present invention a method for projecting image contents onto an inside wall of a transport means is proposed with which optical image contents are generated and the image contents generated are deflected onto a ceiling panel of a transport means.

According to a further embodiment of the present invention the method comprises the additional step of correcting the image contents prior to projection onto the inside wall.

According to a further embodiment of the present invention a projection system for projecting image contents onto to the ceiling in a transport means is proposed, which comprises a plurality of the above described ceiling projection devices and a computer system which is adapted for correcting the image contents prior to the projection onto the inside wall, for further processing partial videos and for providing various image data at four projectors, respectively, thereby allowing a continuous image to be projected onto the inside wall or the ceiling panel.

Further embodiments and advantages of the invention are revealed in the sub-claims.

In the following preferred embodiments of the present invention are described with reference to the figures.

The illustrations in the figures are schematic and not according to scale.

DETAILED DESCRIPTION

In the following description of the figures identical reference symbols are used for identical or similar elements.

Figure 1:
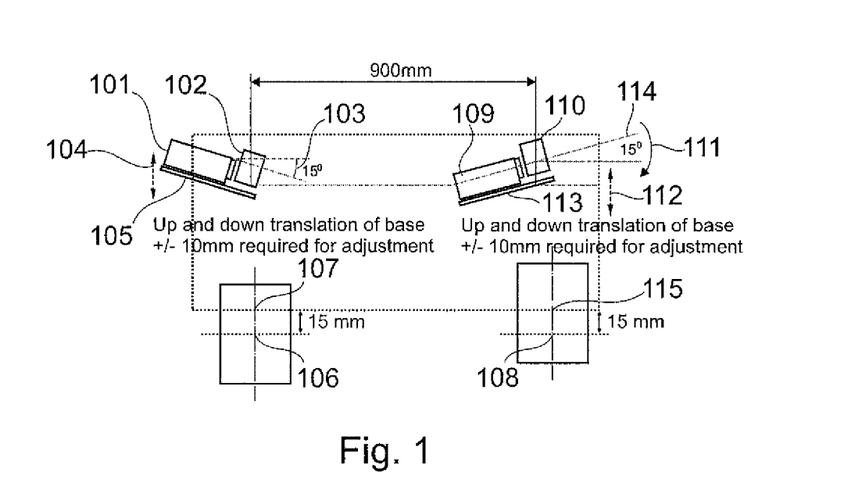
FIG. 1 shows a schematic illustration of the tilting of the projector and of the mirror alignment according to an embodiment of the present invention.

FIG. 1 shows an illustration of possible projector tilts and mirror alignments according to an embodiment of the present invention. Provided is a projector 101 which is arranged on a base plate 105. The base plate 105 may also be constructed as a correspondingly mounted arm (support arm) and is able to move the projector in horizontal direction 104, for example, by 10 mm at a time, in order to be able to carry out a fine adjustment of projector 101. It is also possible to tilt the projector 101, for example by plus/minus 15° (see reference symbols 103, 111).

Further, a mirror 102 is provided which deflects the projection beam from the projector onto the ceiling panel (not shown in FIG. 1).

A second projector 109 is provided which is installed on a second base plate 113 or a second support arm 113. Further, a second mirror 110 is provided for deflecting the beam from the second projector onto the ceiling panel. The second projector 109 also can be moved upwards or downwards or tilted. Further, projector 109 may be rotated along its longitudinal axis 114.

The distance between the two projectors 101, 109 may be 900 mm, for example. Other distances, however, are also possible.

In the lower area of FIG. 1 the relative position of the reference points 106, 115 of mirrors 102, 110 and of the centres of the projected images 107, 108 (which correspond to the aperture centres of the projector optics) are shown. The image centre 107 lies approximately 15 mm above reference point 106. Correspondingly the central point 108 of the image from the right-hand projector lies approximately 15 mm below reference point 115.

In total 12 projectors may be mounted in the overhead storage bins, which respectively project onto the opposite ceiling panel via a mirror. The mirrors are used, on the one hand, to lengthen the light path thereby enlarging the projecting area and on the other, to rotate the picture of the image (which may be achieved via a corresponding tilting of the mirror.)

Due to the very steep angle of projection the line structure of the projector (for example a digital light processing beamer (DLP beamer) becomes visible—more or less distinctly depending upon the respective image content. The striped pattern thus created is less disturbing if by placing the image obliquely the stripes become narrower and move closer together. Such an adjustment may be achieved by rotating the projector about the axis of projection (as can be seen in FIG. 1). Alternatively or additionally, the projection beam may be deflected by means of a tiltable mirror 102, 110. The rotation of the image in this case is achieved through rotation about the transverse axis of the projector. In lamp projectors a considerable amount of energy is created which must be removed by means of suitable cooling measures in order to avoid a reduction in the life of the lamp. A sufficient cooling air flow must be ensured, structure and geometric orientation of lamp and projector must be taken into consideration.

Figure 2:
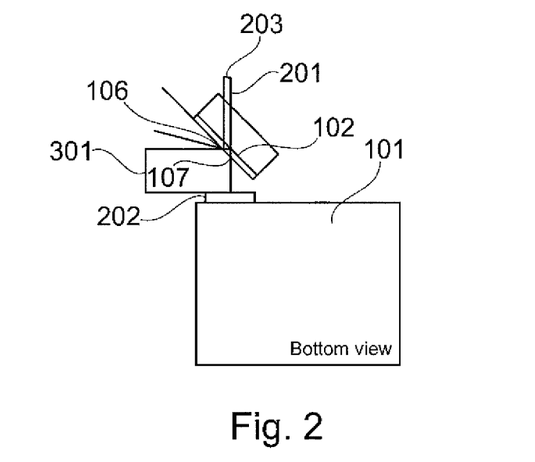
FIG. 2 shows an illustration of a projector-lens-arrangement according to a further embodiment of the present invention.

FIG. 2 shows a relative arrangement of mirror 102 and projector 101. The mirror may, for example, be a metal plate or a conventional mirror. The mirror dimensions are, for example, 81×81×1 mm.

The longitudinal axis or image axis of the projector is marked by the reference symbol 201. Further the projector 101 may comprise a lens 202 for focussing or widening the projection beam as appropriate.

The projector unit 101 may be attached to the cabin structure by means of an aluminium arm. This makes it possible to position the projector in the Y-axis (aircraft coordinates) and to approximately set the direction of projection. The deflecting mirror 102 may, for example, be attached to a ball-joint bracket thus considerably easing fine adjustment of the image onto the ceiling panels.

Subsequent correcting of the image is effected by means of commercially available software.

The distance here (in the image plane) between the image axis 201 and the reference point 106 is 7.5 mm (see reference symbol 203).

Figure 3:
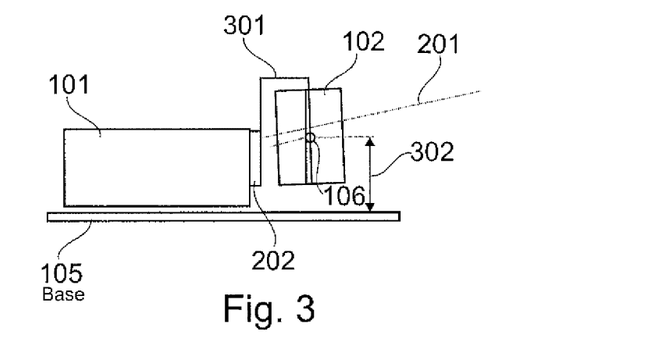
FIG. 3 shows an illustration of the mirror alignment according to an embodiment of the present invention.

FIG. 3 shows the mirror alignment of FIG. 2, this time, however, not as viewed from below (as in FIG. 2) but from the side. The distance between the projector lens 202 and the reference point 106 is 41.7 mm, for example. The horizontal distance between the lower edge of the projector and the reference point is, for example, 55.5 mm (see reference symbol 301, 302).

Figure 4:
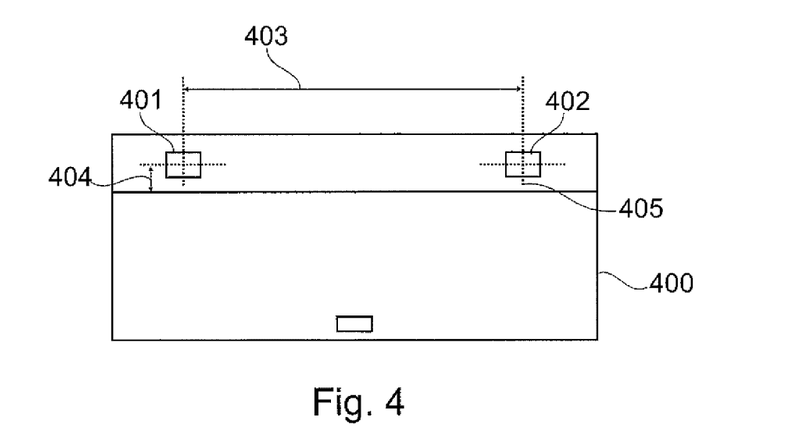
FIG. 4 shows an illustration of the dimensions of the beam aperture according to an embodiment of the present invention.

FIG. 4 shows the dimensions of the beamer aperture. The overhead luggage bin 400 has two apertures 401, 402 which are at a distance of 900 mm (reference 403) from each other. This distance may be reduced, however, to 800 mm for example. The dimensions of apertures 401, 402 are, for example, 75×60 mm. The heights 404, 405 in which the beamer apertures are located, are variable.

Figure 5:
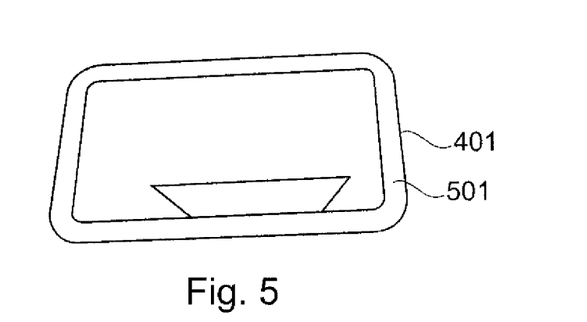
FIG. 5 shows a beam aperture in an overhead storage bin according to an embodiment of the present invention.

FIG. 5 shows a beamer aperture 401 in the overhead luggage bin. The beamers project through apertures in the overhead luggage bins onto the ceiling. Frames 501 may be placed into these apertures which comprise trapezoidal cut-outs. These cut-outs are formed in such a way that the light of the projectors can escape from the overhead luggage bins only in a trapezoidal cone (see FIG. 7). On the one hand this serves as an eye protection so that people in the cabin cannot see into the overhead luggage bin. On the other hand it blocks out any interfering light. Without the trapezes stray light from a projector would fall, not only upon the desired area of projection but also upon the adjacent panels. In these places, even with a black image content, the residual brightnesses of several projectors would add up creating a strongly visible triangular pattern.

Figure 6:
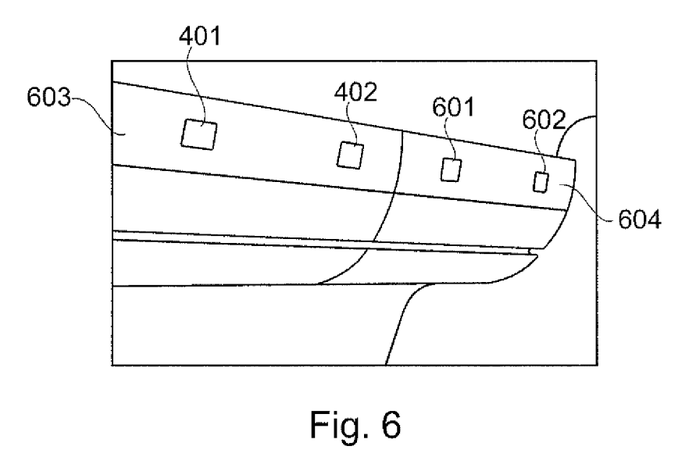
FIG. 6 shows an arrangement of beam apertures in the overhead storage bins according to an embodiment of the present invention.

FIG. 6 shows a possible arrangement of beamer apertures in the overhead luggage bins 603, 604. Apertures 401, 402 are in the first overhead luggage bin 603. Apertures 601, 602 are in the second overhead luggage bin 604. The apertures are arranged in the upper areas of the overhead luggage bins, respectively. However, they could also be arranged further down or somewhat further up, depending upon requirements.

Figure 7:
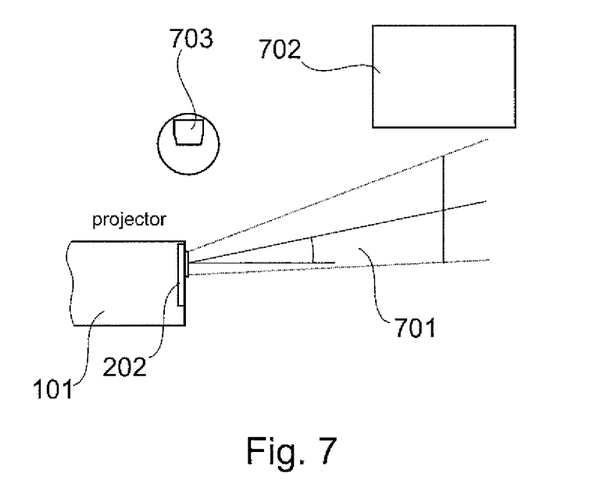
FIG. 7 shows the beam path of the projector according to an embodiment of the present invention.

FIG. 7 shows a possible beam path of projector 101. Projector 101 generates an image beam which is correspondingly focussed by the projector lens 202. The bundle of light 701 exiting from the projector is rectangular in cross-section 702 which changes to become a trapezoidal area on the ceiling extending obliquely to the direction of projection of the aircraft cabin. For generating composite presentations, however, rectangular individual images are preferably used. Using a suitable aperture 401 (see FIG. 6), which again, has a trapezoidal shape, the area of projection can be trimmed to form a rectangle. This has the advantage that light portions not needed for projection do not reach the surface of the screen and thus do not contribute to an avoidable reduction in contrast. Besides the projection aperture is reduced thereby limiting undesired glimpses into the projection system as well as blinding the viewer.

The projectors are, for example, beamers certified for air transport with minimum dimensions in order to keep the reduction of storage space in the overhead luggage bins to a minimum. The projectors comprise, for example, a lamp as light source and different pixel array image generators (DLP, LCOS, LCD, . . . ). Or the projector may be constructed as an LED beamer or as a projector with scanning image build-up, preferably with laser light sources, or as a projector with holographic elements for image generation and with laser light sources.

During venting and cooling of the system special care must be taken that each projector releases about 150 watts of energy. Overheating must be avoided since otherwise the life of the lamp may be reduced. Further, overheating may lead to emergency switch-offs of the projector system.

Figure 8:
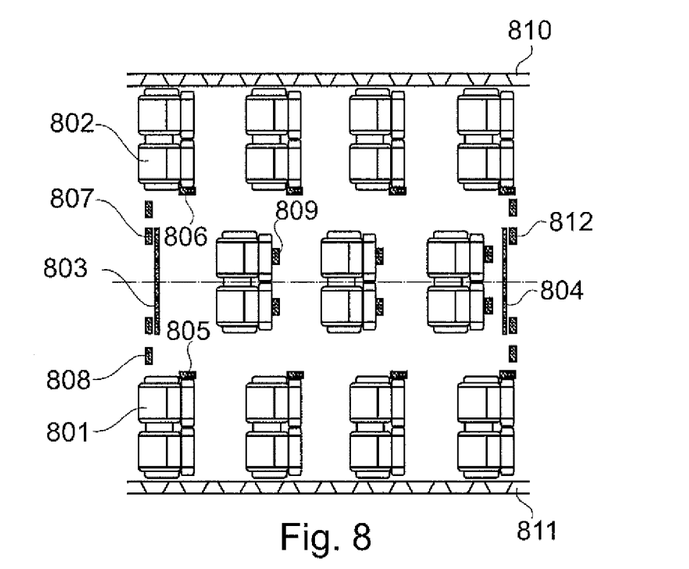
FIG. 8 shows possible beamer positions in an aircraft cabin according to an embodiment of the present invention.

FIG. 8 shows possible positions in a passenger cabin 800. The passenger cabin 800 is shown in top view in FIG. 8. On the sides the cabin 800 is limited by walls 810, 811. Several rows of seats, each with two seats, are provided. Naturally other seating configurations may be provided, for example a 2-3-2 configuration or other configuration.

The projectors 805, 806 are, for example, installed in the overhead luggage bins 801 or 802 or laterally in the arm rest.

Projector 808, for example, is housed in the floor of the passenger cabin. Further, projectors 809 are attached behind the seats. Projector 807 is arranged in the front area of the passenger cabin and is, for example, integrated in the floor or in the wall 803. Correspondingly projector 812 is integrated in the rear area of the passenger cabin and is, for example, integrated in the floor or in the rear wall 804.

The projectors may thus be positioned in very different places in the aircraft, from where projection onto the ceiling is possible. As can be seen in FIG. 8, these are for example, positions behind the seats or in the floor.

Figure 9:
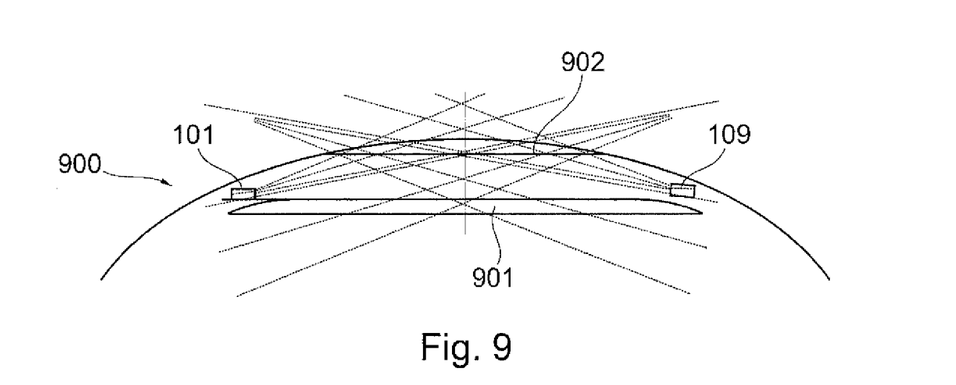
FIG. 9 shows a back projection via mirrors according to an embodiment of the present invention.

Furthermore a back projection through a semi-transparent ceiling is considered, FIG. 9 shows a schematic cross-section illustration of the ceiling area in an aircraft. The ceiling area 900 comprises a transparent or semi-transparent ceiling 901, above which two projectors 101, 109 are attached which direct their projection beams onto a mirror 902 which deflects the beams in such a way that they are projected from above onto the semi-transparent ceiling. FIG. 9 thus shows the projection of the image contents via a mirror 902 onto the semi-transparent ceiling 901.

Figure 10:
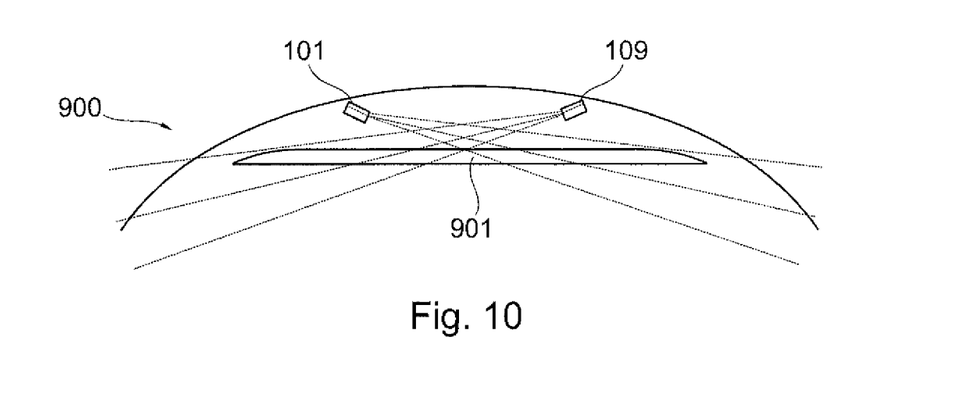
FIG. 10 shows a direct back projection according to an embodiment of the present invention.

FIG. 10 also shows a schematic cross-section illustration of the upper area of a passenger cabin 900, where the semi-transparent ceiling 901 is irradiated directly by the two projectors 101, 109.

Also, one of the two detectors 101 can directly irradiate the semi-transparent ceiling 901, whilst the other irradiates the ceiling indirectly with the aid of mirror 902 (see FIG. 9).

Since the projectors, once they have been fitted into the overhead luggage bin, are accessible only for maintenance purposes, switching the projectors on and off may, for example, be effected via an infrared diode. For this purpose the infrared diode is attached to the infrared receiver of the projector thereby allowing the infrared signals for On/Off to be sent to the projector via cable.

The projectors are activated using a software DVD player 1201 which splits the image contents up into three identically sized partial videos. These partial videos are sent to three computers 1202, 1203, 1204 which read in the signal with the aid of a frame grabber card and correct it, for example by means of graphic hardware or software correction. Each of these three computers has, in turn, two graphic cards 1205, 1206, 1207, 1208, 1209, 1210, respectively, each with two VGA (Video Graphics Array) outputs. Thus each individual computer can provide up to four projectors 1211, 1212, 1213, 1214, 1215, 1216, 1217, 1218, 1219, 1220, 1221, 1222 with various image data. In total, twelve separate data streams are thus available thereby allowing a continuous picture to be projected onto the ceiling (see FIGS. 11 and 12).

Figure 11:
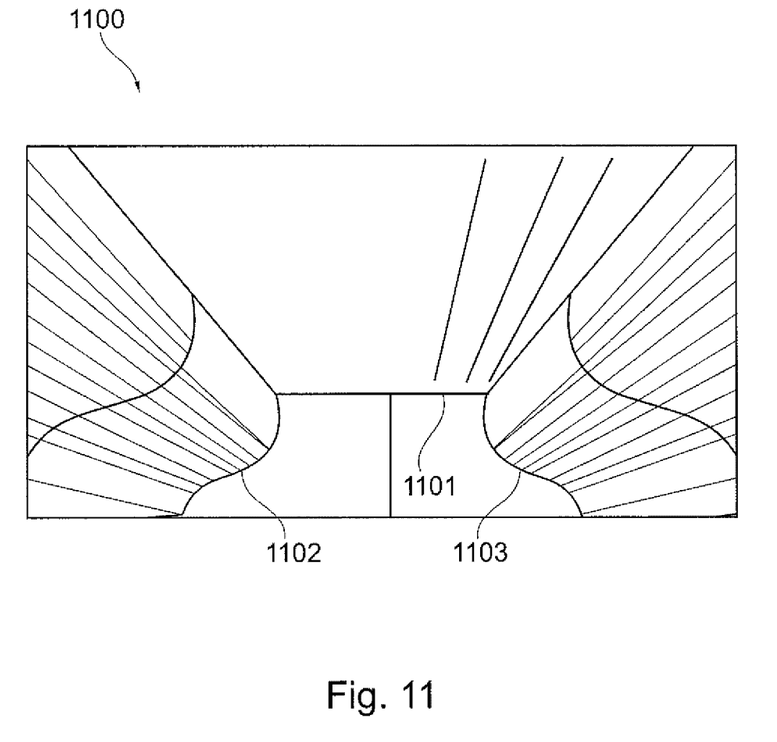
FIG. 11 shows the projection of various image contents onto a ceiling panel of an aircraft according to an embodiment of the present invention.
Figure 12:
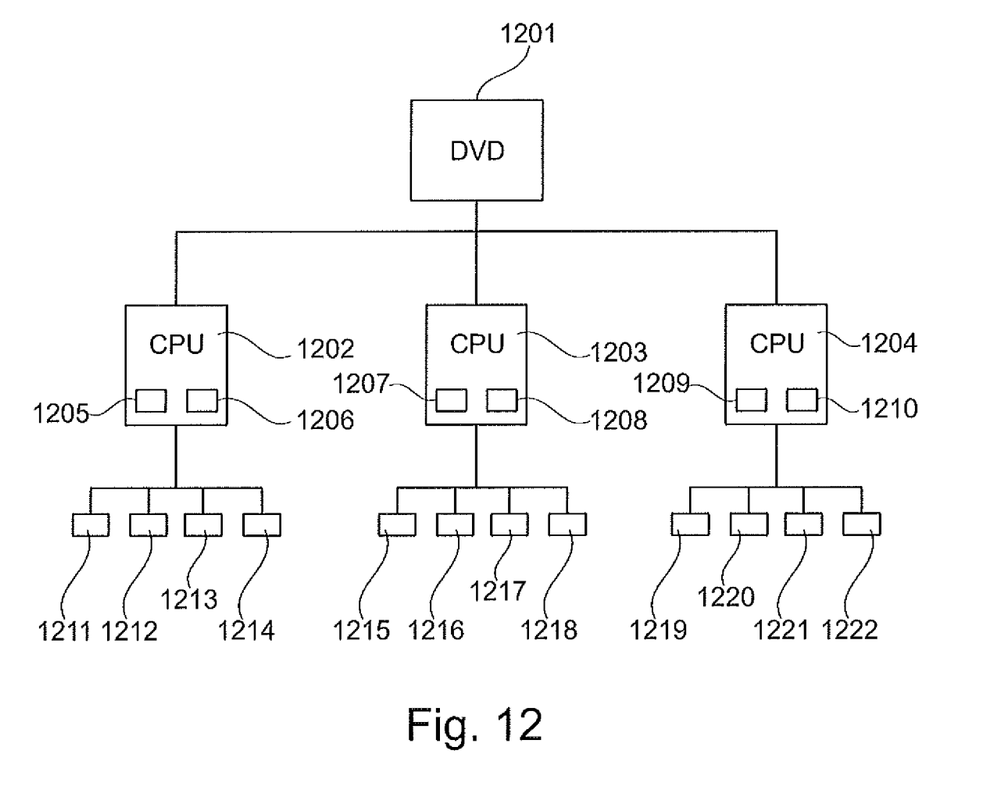
FIG. 12 illustrates a DVD device connected to three processors, each of which processors comprises at least two graphic cards and can hook up to at least four projectors.

FIG. 11 shows the ceiling area of a passenger cabin 1100 which comprises three ceiling panels 1101, 1102, 1103 onto which image data is projected in a large-scale manner. Alternatively the ceiling panels 1102, 1103 may be constructed as chains of overhead luggage bins. The whole projection system is constructed in such a way that complete films can be shown in the entire ceiling area of the passenger cabin, each projector projecting a certain part of the film.

In this way any given contents may be projected onto curved aircraft cabin ceilings. It is optimal if optical systems are provided for image enhancement as regards geometry and various image interferences.

In this way the intrinsically confined conditions in an aircraft cabin can be subjectively enlarged for passengers. Furthermore the entertainment value/the flying comfort in an aircraft cabin can be enhanced.

The necessary support and adjusting capabilities are made available in the form of optical-mechanical devices as well as through modification of the projection optics, thereby allowing an aircraft cabin to be designed with ceiling projection with the aid of projectors.

In conclusion it should be pointed out that "comprising" does not exclude any other elements or steps and that "one" does not exclude a plurality. Furthermore it is pointed out that features or steps described with reference to one of the above embodiments may also be used in combination with other features or steps of other above-described embodiments. Reference symbols in the claims are not to be regarded as limiting.

The invention claimed is:

1. A projection device for projecting image contents onto an inside wall of a cabin of a transport device, the projection device comprising:

a projector for generating optical image contents and for projecting the generated image contents onto an inside wall of the transport device;

a DVD player controlled by a non-transitory computer program for splitting the image contents into a plurality of partial identically sized videos;

a plurality of calculation units for reading in one of the plurality of partial videos, respectively, and for correcting the one partial video, respectively;

wherein each of the plurality of calculation units comprises at least first and second graphic cards for further processing one partial video each, and for providing various image data at a plurality of projectors respectively, thereby allowing a continuous image to be projected onto the inside wall.

2. The projection device according to claim 1, further comprising:

a mirror for deflecting the image contents generated by the projector onto the inside wall of the transport device.

3. The projection device according to claim 2, wherein the mirror comprises a bracket for adjustment of the location at which the image contents are projected onto the inside wall.

4. The projection device according to claim 1, wherein the projector comprises a support with which the projector is fastened to a cabin structure.

5. The projection device according to claim 1, whereby the projector is integrated into an overhead luggage bin of the transport device, into a passenger seat of the transport device or into a floor element of the transport device.

6. The projection device according to claim 5, wherein the overhead luggage bin comprises a frame with a trapezoidal cut-out such that light of the projector exits in a trapezoidal cone.

7. The projection device according to claim 1, wherein the inside wall is constructed as a semi-transparent ceiling panel; and wherein the projector is arranged above the semi-transparent ceiling panel of the passenger cabin.

8. The projection device according to claim 1, further comprising:

an infrared receiver on the detector for detecting an optical On/Off signal; and an infrared diode for generating an optical On/Off signal; whereby generating the optical On/Off signal is triggered by a control unit connected to the infrared diode via a cable.

9. The projection device according to claim 1, further comprising:

a calculation unit for equalizing the image contents prior to projection onto the inside wall.

10. A projection system for projecting image contents in a transport means, the system comprising:

a plurality of projection devices for projecting image contents onto an inside wall of a cabin of a transport device, each of the plurality of projecting devices comprising:

a projector for generating optical image contents and for projecting the generated image contents onto an inside wall of the transport device; and a computer system for equalizing the image contents prior to projection onto the inside wall, for further processing partial videos and for providing various image data at a plurality of projectors respectively, thereby allowing a continuous image to be projected onto the inside wall.

11. A method for projecting image contents onto an inside wall in a transport device, the method comprising the steps of:

generating optical image contents; and deflecting the generated image contents onto an inside wall of the transport device splitting, by a DVD player controlled by a non-transitory computer program, the image contents into a plurality of partial identically sized videos;

reading, by a plurality of calculation units, in one of the plurality of partial videos, respectively, and correcting, by a plurality of calculation units, the one partial video, respectively;

processing, by at least first and second graphic cards in each of the calculation units, one partial video each; and providing various image data at a plurality of projectors respectively, thereby allowing a continuous image to be projected onto the inside wall.

12. The method according to claim 11, further comprising the step of equalizing the image contents prior to projection onto the inside wall.

\* \* \* \* \*